United States Patent
Vu et al.

(12)
(10) Patent No.: US 6,779,758 B2
(45) Date of Patent: Aug. 24, 2004

(54) BOOM DEPLOY SYSTEM

(75) Inventors: Khoi T. Vu, Randolph, NJ (US); Valentin G. Barba, Scotrun, PA (US)

(73) Assignee: Smiths Aerospace, Inc., Whippany, NJ (US)

(*) Notice: Subject to any disclaimer, the term of this patent is extended or adjusted under 35 U.S.C. 154(b) by 0 days.

(21) Appl. No.: 10/431,024

(22) Filed: May 6, 2003

(65) Prior Publication Data

US 2003/0218097 A1 Nov. 27, 2003

Related U.S. Application Data

(60) Provisional application No. 60/378,803, filed on May 7, 2002.

(51) Int. Cl.[7] .............................................. B64D 37/00
(52) U.S. Cl. .................................................. 244/135 A
(58) Field of Search ........................... 244/135 A, 135 R

(56) References Cited

U.S. PATENT DOCUMENTS

| | | | |
|---|---|---|---|
| 2,663,523 A | 12/1953 | Leisy | .......................... 244/135 |
| 2,949,265 A | 8/1960 | Person | .......................... 244/135 |
| 2,960,295 A | * 11/1960 | Schulze | .................. 244/135 A |
| 3,091,419 A | 5/1963 | Mosher | ...................... 244/135 |
| 4,129,270 A | * 12/1978 | Robinson et al. | ........ 244/135 A |
| 4,586,683 A | * 5/1986 | Kerker | ................... 244/135 A |
| 5,996,939 A | * 12/1999 | Higgs et al. | ............. 244/135 A |
| 6,025,683 A | 2/2000 | Philipp | ........................ 318/257 |

FOREIGN PATENT DOCUMENTS

| | | | | |
|---|---|---|---|---|
| DE | 100 13 751 A1 | 10/2001 | ........... | B64D/39/00 |
| GB | 2 163 710 A | 3/1986 | ............. | B64D/1/22 |

* cited by examiner

*Primary Examiner*—J. Woodrow Eldred
(74) *Attorney, Agent, or Firm*—Fish and Neave; Robert R. Jackson; Jeffrey C. Aldridge

(57) ABSTRACT

A boom deploy actuator with improved maintainability and simplicity has an electric motor and control circuitry for selectively powering the motor to develop torque with either rotational direction for rotating a capstan to vary the length of a boom cord extending from the capstan to a boom. In a preferred embodiment, the motor is a brushless electric motor. The control circuitry preferably includes circuit components for limiting the speed of the motor.

44 Claims, 2 Drawing Sheets

BOOM DEPLOY SYSTEM

CROSS REFERENCE TO RELATED APPLICATION

This application claims the benefit of U.S. Provisional application No. 60/378,803, filed May 7, 2002.

BACKGROUND OF THE INVENTION

This invention relates to actuators used in aircraft boom deploy systems for aerial refueling. More specifically, this invention relates to systems and methods for improving the simplicity and maintainability of aircraft boom deploy actuators.

Several systems are used by aircrafts in order to aerially refuel other aircrafts. One known type of refueling system is the so-called "boom deploy" system. In this type of system, a boom extends from the tanker or fuel-source aircraft to the fuel-receiving aircraft, whereby fuel is conveyed from the former to the latter aircraft. The boom is generally pivotally mounted beneath the tail of the fuel-source aircraft and must be deployed (i.e., extended) downwardly from the fuel-source aircraft to a fuel-receiving aircraft positioned behind and beneath the fuel-source aircraft.

Most of the known boom-deploying systems are hydraulic, which generally include a bi-directional hydraulic motor and a control structure with a valve for causing fluid flow through the motor in either of two directions in order to move the boom between stow and deploy positions. These hydraulic systems are of high complexity and therefore require substantial and costly maintenance.

Therefore, it would be desirable to provide an electromechanical system and method for deploying tanker booms to be used during a refueling process. It would be further desirable to deploy and stow the boom in a controlled manner, so as to eliminate snapping of the boom cord.

In view of the foregoing, it is an object of this invention to provide a boom deploy actuator using systems and methods that significantly improve the simplicity, maintainability, and reliability of deploying and stowing tanker booms during a refueling process.

SUMMARY OF THE INVENTION

These and other objects are accomplished in accordance with the principles of the present invention by providing a boom deploy actuator using systems and methods that significantly improve the simplicity, maintainability, and reliability of deploying and stowing tanker booms during a refueling process.

In accordance with the present invention, there is provided a method for deploying a tanker boom. The method includes developing a deploy starting torque that has a first rotational direction using a boom deploy actuator. The deploy starting torque is used for rotating a capstan for moving the boom from a stowed position toward a fully deployed position. The method also includes developing a slack remover torque that has a second rotational direction opposite the first rotational direction using the boom deploy actuator. The slack remover torque is used for rotating the capstan to remove any slack in a boom cord that extends from the capstan to the boom. Furthermore, the method includes developing a stow operation torque that also has the second rotational direction using the boom deploy actuator. The stow operation torque is used for rotating the capstan to move the boom from its fully deployed position to its stowed position.

BRIEF DESCRIPTION OF THE DRAWINGS

The above and other advantages of the invention will be more apparent upon consideration of the following detailed description, taken in conjunction with the accompanying drawings, in which like reference characters refer to like parts throughout, and in which:

FIG. 1A is a vertical cross-sectional view of a part of the system of FIG. 1, taken from line 1A—1A of FIG. 1.

DETAILED DESCRIPTION

Figure 1:
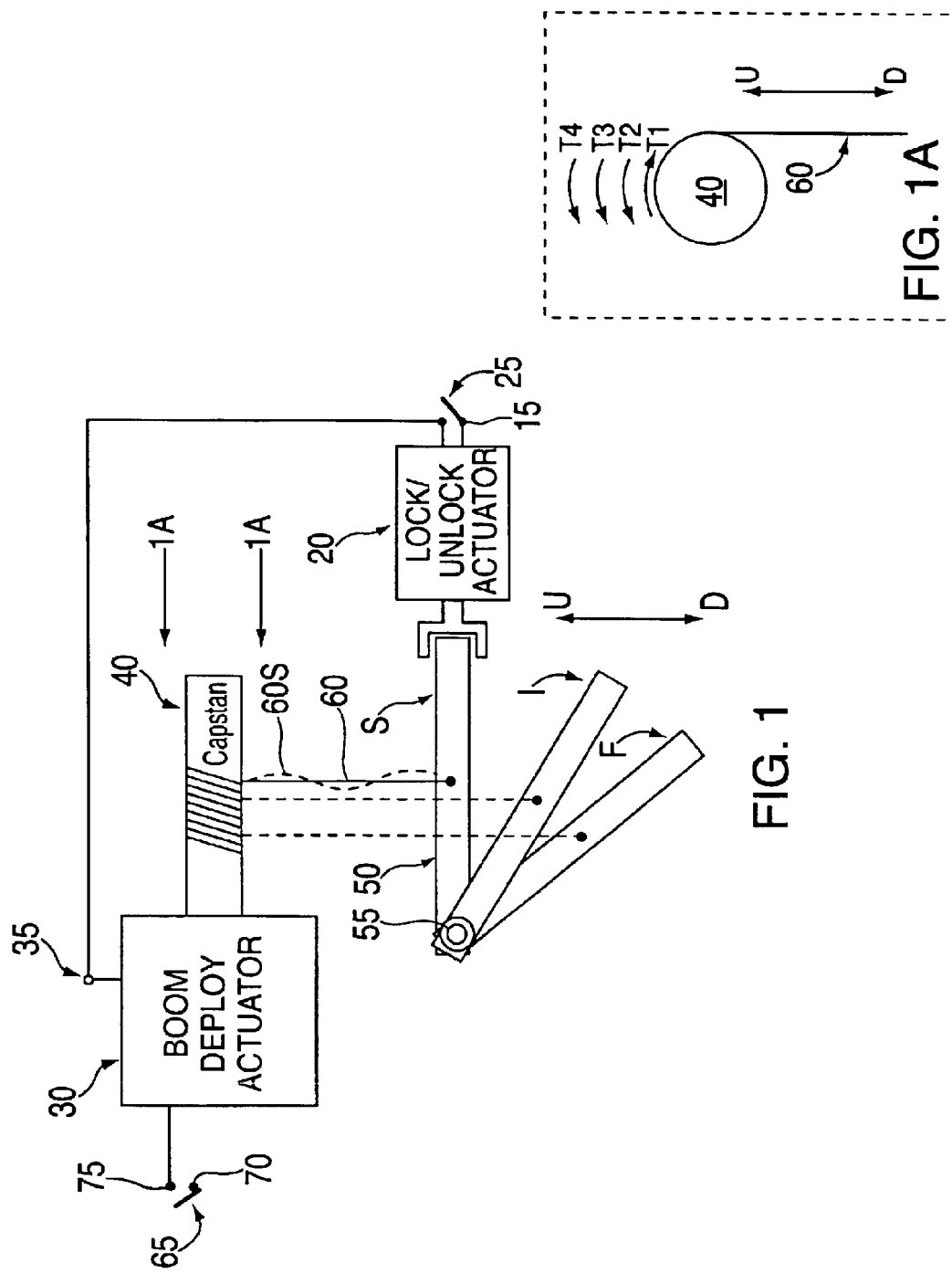
FIG. 1 is a simplified elevational view, partly in section, of an illustrative aircraft boom deploy actuator electromechanical system in accordance with the present invention, illustrating three permissible variations in position of the boom during the refueling operation.

As shown in FIGS. 1 and 1A, an illustrative embodiment of aircraft boom deploy actuator electromechanical system 10 includes lock/unlock actuator 20, boom deploy actuator 30, rotatable capstan 40, boom 50, and boom cord or cable 60. An electrical signal may be sent by the boom operator, for example, from system power supply 15 to electromechanical lock/unlock actuator 20 in order to unlock boom 50 for deployment from a fuel-source aircraft equipped with system 10. As a result, lock/unlock actuator 20 no longer holds boom 50 in its stowed position S. When unlocked, the deploying end of boom 50 tends to pivot downwardly in direction D under the influence of gravity on pivot 55, to which the anchored end of boom 50 is held. Pivot 55 is mounted to the fuel-source aircraft, preferably beneath its tail. The anchored end of boom 50 is substantially fully open internally to allow the passage of fuel therethrough.

The motion of boom 50 can be controlled by paying out boom cord or cable 60, which extends from rotatable capstan 40 and is coupled to boom 50. The torque and rotation of capstan 40 is controlled by boom deploy actuator 30.

Once boom 50 is unlocked, switch 25 closes, thereby coupling electrical power from power supply 15 to terminal 35 of boom deploy actuator 30. This coupling causes boom deploy actuator 30 to develop a deploy starting torque T1 on rotatable capstan 40, which ensures that boom 50 starts deploying from its stowed position S in downward direction D (as shown in FIG. 1A).

Either after a predetermined amount of time or after the rate of the deploying motion of boom 50 in direction D reaches a predetermined value, wherein boom 50 is in an intermediate position I between its stowed position S and its fully deployed position F, boom deploy actuator 30 stops developing starting torque T1 and begins developing a slack remover torque T3 on capstan 40 with a reverse direction to that of starting torque T1. Slack remover torque T3 removes any slack from boom cord 60 (shown, for example, in FIG. 1 by broken line 60s). Slack 60s may result from upward movement of boom 50 in direction U, which may be caused by external aerodynamic forces, for example.

When the rate of downward deployment of boom 50 reaches a particular value, boom deploy actuator 30 shifts to a damper mode in which an opposing damping torque T4 is developed by boom deploy actuator 30 on capstan 40. Damping torque T4 may be proportional to the rate of downward deployment of boom 50, thereby preventing the boom rate from becoming excessive. The use of damping torque T4 results in a soft landing of boom 50 in its fully deployed position F. Even after boom 50 reaches its fully deployed position F, boom deploy actuator 30 continues to develop slack remover torque T3 throughout the remainder of the refueling process. Damping torque T4 may also continue to be available if needed to prevent excessively rapid downward movement of boom 50.

At the end of the refueling process, a command 70 to stow boom 50 may be given by the boom operator at terminal 75 of boom deploy actuator 30 by closing switch 65. As a result, boom deploy actuator 30 develops a stow operation torque T2 on capstan 40 that is required to move boom 50 upwardly in direction U back to its stowed position S. Once boom 50 reaches stowed position S, lock/unlock actuator 20 locks boom 50 and opens switch 25, thereby disconnecting power supply 15 from terminal 35 of boom deploy actuator 30.

Figure 2:
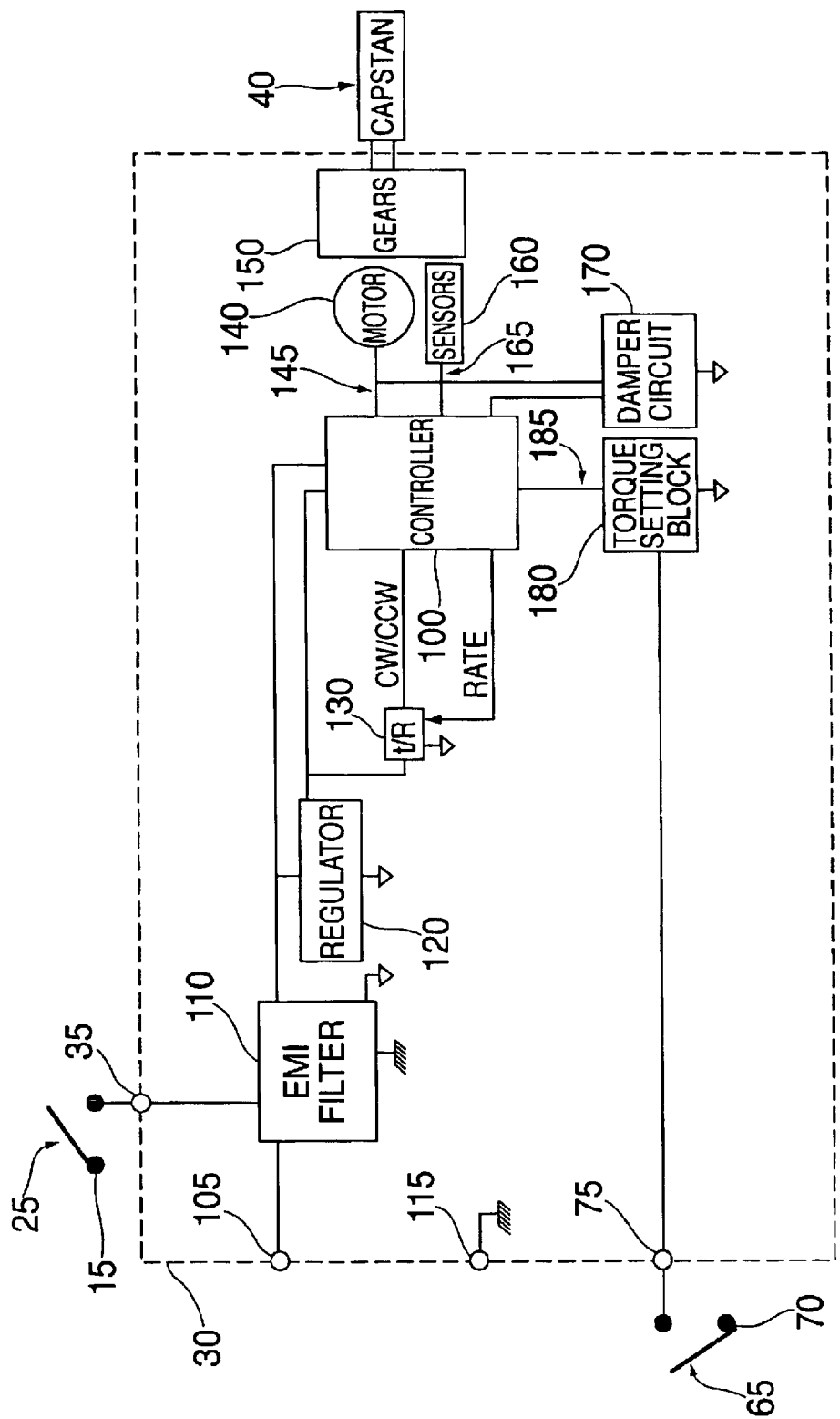
FIG. 2 is a detailed schematic block diagram of a preferred embodiment of the boom deploy actuator of FIG. 1.

An illustrative embodiment of boom deploy actuator 30 is shown in more detail in FIG. 2. When switch 25 is closed, actuator 30 receives aircraft DC power (e.g., 24–270 volts DC) from power supply 15 via terminal 35. Electromagnetic interference ("EMI") filter 110 is coupled to terminal 35 to protect the electrical system of boom deploy actuator 30 from interferences conducted and radiated from the aircraft's electrical system, and vice versa. Other terminals 105 and 115 represent the DC Power Return and the GROUND, respectively.

Aircraft power is conducted through EMI filter 110 to motor and driver controller 100 (hereinafter, simply "controller 100"). This filtered power is also conducted to voltage regulator 120, which supplies low level voltages (e.g., 15 volts DC) required by the electronic control circuitry of boom deploy actuator 30. When switch 25 closes, circuitry 130 outputs a temporary command CW for controller 100 to apply pulse width modulated ("PWM") power signals, via power wires 145, to brushless electric motor 140 that are appropriate to cause motor 140 to operate with an output of deploy starting torque T1 having a clockwise rotation. (The directions "clockwise" and "counter-clockwise" referred to herein are purely arbitrary and can be reversed if desired.)

Brushless motor 140 has many advantages over brushed motors. Firstly, because brushless motor 140 has no brush drag, the overall efficiency of the motor is higher. Moreover, brushless motor 140 generates less electrical noise, performs with less deterioration, and requires significantly less maintenance than a brushed motor.

The output of motor 140 drives capstan 40 through gears 150. (The torque-scaling effect of gears 150 is ignored in this discussion.) Boom cord 60 is wrapped around capstan 40, and the length of cord 60 payed out between capstan 40 and the free end of boom 50 may vary as capstan 40 rotates. Torque T1 is a predetermined torque that ensures that the initial downward movement of boom 50 from its stowed position S (see FIG. 1) is not inhibited by motor 140, gears 150, or capstan 40. While promoted greatly by gravity in combination with the weight of boom 50 and its aerodynamic surfaces (if provided), this movement may be impeded initially by frozen gears or other factors that would keep boom 50 in its stowed position S without the aid of deploy starting torque T1.

Either after a predetermined amount of time or after the deployment rate of boom 50 reaches a predetermined value (circuitry 130 may be fed with RATE information by controller 100, for example), circuitry 130 outputs a command CCW for controller 100 to apply PWM power signals, via power wires 145, to brushless electric motor 140 that are appropriate to cause motor 140 to operate with an output of slack remover torque T3 having a counter-clockwise rotation. Controller 100 may apply a constant current based on the weight of boom cord 60 being used to cause motor 140 to operate with output torque T3. Preferably, torque T3 is not sufficient to significantly affect motion of boom 50, but it is sufficient to remove any slack 60s from boom cord 60 in the event that boom 50 moves upwardly in direction U at any time during the boom deployment and subsequent refueling operations, for example.

Boom deploy actuator 30 is equipped with Hall effect sensors 160 that signal the angular position of motor 140 to controller 100 via sensor wires 165. Rotational speed of motor 140 may be ascertained using the frequency of the output of Hall effect sensors 160. Sensor wires 165 replace the need for a commutator in a system that uses a brushed motor. An other advantage of the system of the present invention is that the bridge of brushless motor controller 100 includes at least six MOSFETs to commutate motor 140 (which may be a "Wye" or "Delta" wind motor, for example), thereby providing lower effective ON resistance and the ability to stay cooler at high power levels than a typical brushed motor controller. Alternatively, because a permanent magnet motor generates a back-EMF proportional to its rotational speed, the generated back-EMF may be used by controller 100 to ascertain the rotational speed of motor 140. If controller 100 senses a motor rotational speed in excess of a desired maximum speed, it may reduce the voltage available to motor 140 or it may pulse-width-modulate the motor power signal, so as to drop the rotational speed of the motor to the desired range.

If at any time during boom deployment (and subsequent refueling) boom 50 is moving downwardly excessively rapidly in direction D, boom deploy actuator 30 may shunt back-EMF (electro-motive force) generated by motor 140 into electronic damper circuit 170 in order to place an electrical load on motor 140. By temporarily transforming motor 140 into such a loaded electrical generator, a dynamic braking effect is achieved to cause motor 140 to operate with an output of damping torque T4 having a counter-clockwise rotation. Damping torque T4, which is preferably proportional to the speed of motor 140 and usually significantly greater than (or in addition to) slack remover torque T3, prevents capstan 40 from rotating clockwise excessively rapidly, and thereby prevents boom 50 from moving downwardly excessively rapidly in direction D.

From the foregoing it will be appreciated that damping torque T4 is typically proportional to the rate of deployment of boom cord 60, and hence proportional to the rate of deployment of boom 50. Electronic damper circuit 170 is activated to provide a smooth fall of boom 50 until it reaches its fully deployed position F (see, FIG. 1). Electronic damper circuit 170 may be automatically activated any time the downward movement of boom 50 exceeds a predetermined value during the entire refueling operation.

As mentioned above, any slack 60s in boom cord 60 is removed by slack remover torque T3, which may be constantly developed by motor 140 during the entire boom deployment and refueling operations. This removal of slack has a number of advantages. For example, if slack 60s were to be present in cord 60 when boom 50 moved suddenly downward in excess of the above-mentioned predetermined value, no damping torque T4 would be developed by actuator 30 because damping torque T4 is developed when boom 50 back-drives motor 140. In addition, boom cord 60 could snap when its slack 60s was suddenly exhausted. On the other hand, with slack 60s always removed in accordance with this invention, any downward movement of boom 50 in direction D can be controlled by electronic damper circuit 170, and therefore possible problems due to a fast falling of boom 50 and snapping of boom cord 60 can be avoided. Also, if there were to be a power failure in the system (i.e., system 10), and if boom 50 was in any intermediate position (i.e., position I shown in FIG. 1), boom deploy actuator 30 would continue to produce damping torque T4, thereby allowing boom 50 to land softly in its fully deployed position F.

At the end of the refueling process, a command to stow boom 50 is received via terminal 75 when switch 65 is closed by the boom operator. As a result, torque setting block 180 outputs a command for controller 100 to apply PWM power signals to brushless electric motor 140 that are appropriate to cause motor 140 to operate with an output of stow operation torque T2 having a counter-clockwise rotation. Stow operation torque T2, which may be a constant based on the weight of boom 50 and boom cord 60, and which is usually significantly greater than both slack remover torque T3 and damping torque T4, drives boom 50 upwardly in direction U towards its stowed position S. Once boom 50 has reached its stowed position S, lock/unlock actuator 20 (see FIG. 1) locks boom 50 and opens switch 25, thereby disconnecting power supply 15 from boom deploy actuator 30.

Thus it is seen that an aircraft boom deploy actuator electromechanical system has been provided with improved simplicity and maintainability. One skilled in the art will appreciate that the present invention can be practiced by other than the described embodiments, which are presented for purposes of illustration and not limitation, and the present invention is limited only by the claims which follow.

What is claimed is:

1. A method for deploying a tanker boom comprising:
   developing a deploy starting torque having a first rotational direction using a boom deploy actuator for rotating a capstan to move the boom from a stowed position toward a fully deployed position;
   developing a slack remover torque having a second rotational direction opposite the first rotational direction using the boom deploy actuator for rotating the capstan to remove any slack in a boom cord extending from the capstan to the boom;
   developing a stow operation torque having the second rotational direction using the boom deploy actuator for rotating the capstan to move the boom from its fully deployed position to its stowed position.

2. The method as defined in claim 1, further comprising:
   developing a damping torque having the second rotational direction using the boom deploy actuator for rotating the capstan to provide smooth deployment of the boom.

3. The method as defined in claim 2, wherein developing the damping torque comprises:
   sensing a rotational speed of an actuator motor;
   sensing a first current supplied to the motor; and
   reducing the first current when one condition from the group consisting of the following is true: 1) the rotational speed is higher than a maximum speed and 2) the first current is higher than a maximum current.

4. The method as defined in claim 3, wherein developing the damping torque further comprises:
   shunting a second current generated by the motor into a damper circuit to place an electrical load on the motor if the rotational speed is higher than the maximum speed.

5. The method as defined in claim 3, wherein sensing the rotational speed of the motor comprises measuring a frequency of a Hall effect sensor signal.

6. The method as defined in claim 3, wherein sensing the rotational speed of the motor comprises measuring a back electro-motive force generated by the motor.

7. The method as defined in claim 3, wherein reducing the first current comprises reducing a voltage supplied to the motor.

8. The method as defined in claim 3, wherein reducing the first current comprises pulse-width-modulating a power signal supplied to the motor.

9. The method as defined in claim 1, further comprising:
   controlling a rotational velocity of the boom deploy actuator.

10. The method as defined in claim 9, wherein controlling the rotational velocity of the boom deploy actuator comprises:
    sensing a rotational speed of an actuator motor;
    sensing a first current supplied to the motor; and
    reducing the first current when one condition from the group consisting of the following is true: 1) the rotational speed is higher than a maximum speed and 2) the first current is higher than a maximum current.

11. The method defined in claim 10, wherein controlling the rotational velocity of the boom deploy actuator further comprises:
    shunting a second current generated by the motor into a damper circuit to place an electrical load on the motor if the first current is substantially zero and the rotational speed is higher than the maximum speed.

12. The method as defined in claim 10, wherein sensing the rotational speed of the motor comprises measuring a frequency of a Hall effect sensor signal.

13. The method as defined in claim 10, wherein sensing the rotational speed of the motor comprises measuring a back electro-motive force generated by the motor.

14. The method as defined in claim 10, wherein reducing the first current comprises reducing a voltage supplied to the motor.

15. The method as defined in claim 10, wherein reducing the first current comprises pulse-width-modulating a power signal supplied to the motor.

16. The method as defined in claim 1, wherein developing the deploy starting torque further comprises:
    providing a signal to a lock/unlock actuator for unlocking the boom in its stowed position;
    switching a first switch for providing power to the boom deploy actuator; and
    supplying a first current to an actuator motor using a control block.

17. The method as defined in claim 16, wherein the first current is dependent upon the weight of the boom.

18. The method as defined in claim 16, wherein developing the slack remover torque further comprises:
    supplying a second current to the actuator motor using the control block.

19. The method as defined in claim 18, wherein the second current is dependent upon the weight of the boom cord.

20. The method as defined in claim 18, wherein developing the stow operation torque further comprises:
    switching a second switch for providing power to stow operation circuitry; and
    supplying a third current to the actuator motor using the stow operation circuitry.

21. The method as defined in claim 20, wherein the third current is dependent upon the weight of the boom and the weight of the boom cord.

22. A boom deploy actuator comprising:
    an electric motor coupled to a capstan for rotating the capstan in either rotational direction, wherein the length of a boom cord extending from the capstan to a boom varies with the rotation of the capstan; and
    control circuitry for selectively powering the motor to develop torque with either rotational direction.

23. The boom deploy actuator as defined in claim 22, wherein the electric motor is an electric brushless motor.

24. The boom deploy actuator as defined in claim 22, wherein the control circuitry comprises circuit components for limiting the speed of the motor.

25. The boom deploy actuator as defined in claim 24, wherein the circuit components for limiting the speed of the motor comprise:
    damper circuitry for selectively applying electrical current generated by the motor to an electrical load to thereby retard the motor.

26. The boom deploy actuator as defined in claim 25, wherein the circuit components for limiting the speed of the motor further comprise:
    hall effect sensors for measuring the rotational speed of the motor.

27. The boom deploy actuator as defined in claim 22 further comprising:
    first circuitry for selectively commanding the control circuitry to power the motor to develop a first torque with a first rotational direction for urging the boom to move in a predetermined one of its linear directions.

28. The boom deploy actuator as defined in claim 27, wherein the first torque is a boom deploying torque.

29. The boom deploy actuator as defined in claim 27, wherein the first circuitry comprises:
    circuit components for selectively commanding the control circuitry to power the motor to develop a second torque with a second rotational direction for removing slack from the boom cord.

30. The boom deploy actuator as defined in claim 29 further comprising:
    damper circuitry for selectively effecting the motor to develop a third torque with the second rotational direction for limiting the rotational speed of the capstan.

31. The boom deploy actuator as defined in claim 30, wherein the third torque is a damping torque.

32. The boom deploy actuator as defined in claim 30 further comprising:
    torque setting circuitry for selectively commanding the control circuitry to power the motor to develop a fourth torque with the second rotational direction for urging the boom to move in the other predetermined one of its linear directions.

33. The boom deploy actuator as defined in claim 32, wherein the fourth torque is a stow operation torque.

34. A system for providing improved maintainability in the boom deploy actuator as defined in claim 22 comprising apparatus for:
    locking and unlocking the boom in a stowed position; and
    powering the boom deploy actuator when the boom is not locked by the locking and unlocking apparatus.

35. A system for providing improved maintainability in an aircraft boom deploy actuator comprising apparatus for:
    locking and unlocking a boom in a stowed position;
    powering the boom deploy actuator when the boom is not locked by the locking and unlocking apparatus; and
    controlling a rotational velocity of the actuator.

36. A system for providing improved maintainability in an aircraft boom deploy actuator comprising apparatus for:
    locking and unlocking a boom in a stowed position;
    powering the boom deploy actuator when the boom is not locked by the locking and unlocking apparatus; and
    controlling a rotational velocity of the actuator, wherein the apparatus for controlling the rotational velocity of the actuator comprises apparatus for:
    sensing a rotational speed of an actuator motor;
    sensing a first current supplied to the motor; and
    reducing the first current when one condition from the group consisting of the following is true: 1) the rotational velocity is higher than a first speed and 2) the first current is higher than a first threshold current.

37. The system as defined in claim 36, wherein the apparatus for controlling the rotational velocity of the actuator further comprises apparatus for:
    shunting a second current generated by the motor into a damper circuit to place an electrical load on the motor if the rotational speed is higher than the maximum speed.

38. The system as defined in claim 36, wherein the apparatus for sensing the rotational speed of the motor comprises apparatus for:
    measuring a frequency of a Hall effect sensor signal.

39. The system as defined in claim 36, wherein the apparatus for sensing the rotational speed of the motor comprises apparatus for:
    measuring a back electro-motive force generated by the motor.

40. The system as defined in claim 36, wherein the apparatus for reducing the first current comprises apparatus for:
    reducing a voltage supplied to the motor.

41. The system as defined in claim 36, wherein the apparatus for reducing the first current comprises apparatus for:
    pulse-width-modulating a power signal supplied to the motor.

42. A system for providing improved maintainability in an aircraft boom deploy actuator comprising apparatus for:
    locking and unlocking a boom in a stowed position;
    powering the boom deploy actuator when the boom is not locked by the locking and unlocking apparatus; and
    controlling a rotational velocity of the actuator, wherein the apparatus for controlling the rotational velocity of the actuator comprises apparatus for:
    powering a brushless electric motor to rotate a capstan in either rotational direction, wherein the length of a boom cord extending from the capstan to the boom varies with the rotation of the capstan; and
    commanding the apparatus for powering the motor to power the motor to rotate in a first rotational direction for urging the boom to move in a predetermined one of its linear directions.

43. The system as defined in claim 42, wherein the apparatus for commanding further comprises apparatus for:
    selectively commanding the apparatus for powering the motor to power the motor to rotate in a second rotational direction for removing slack from a boom cord extending from the capstan to the boom.

44. The system as defined in claim 43 further comprising apparatus for:
    selectively commanding the apparatus for powering the motor to power the motor to rotate in the second rotational direction for urging the boom to move in the other predetermined one of its linear directions.

* * * * *